Dec. 16, 1952     C. C. VANDER WALL     2,621,827
ANTIRECOIL DEVICE FOR PRESSURE CYLINDERS
Filed Oct. 5, 1951
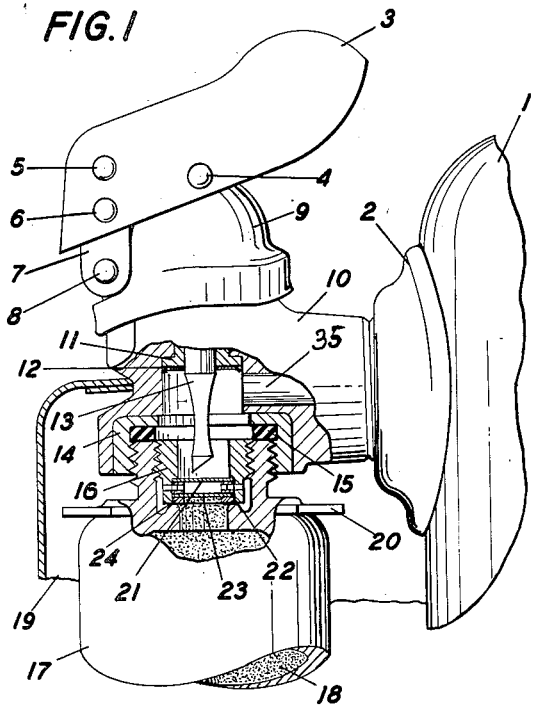
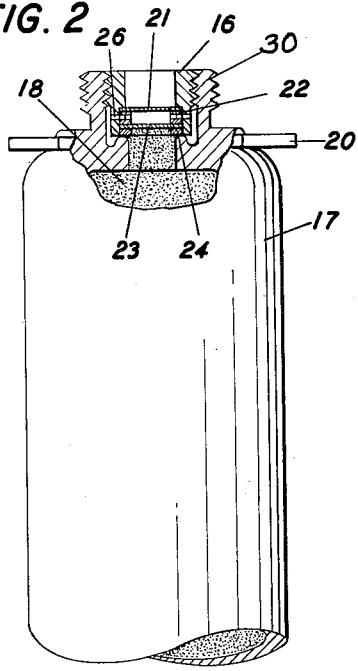
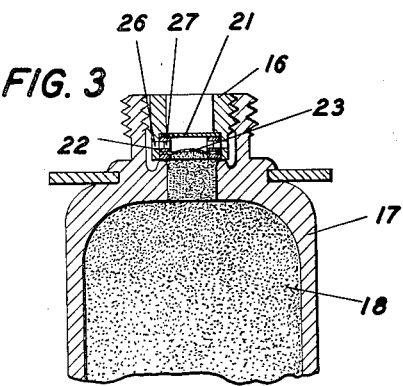
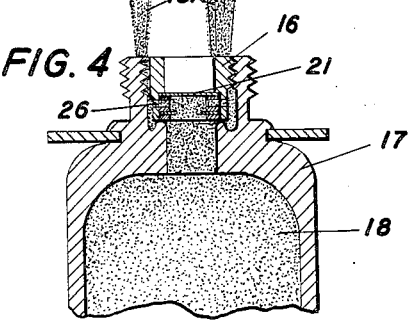
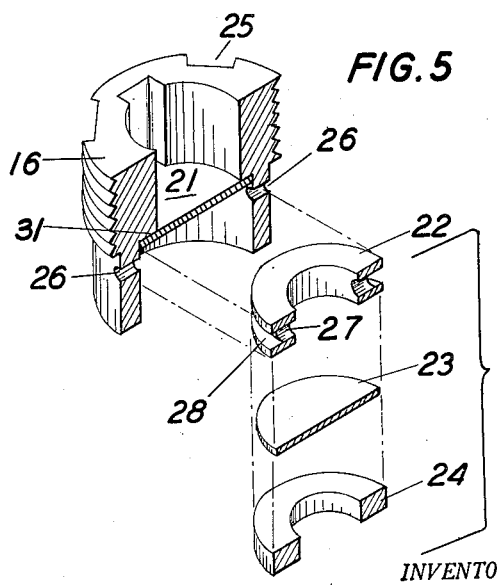
INVENTOR.
CLIFFORD C. VANDERWALL
BY Joseph Rossman
ATTORNEY Patented Dec. 16, 1952

2,621,827

UNITED STATES PATENT OFFICE 2,621,827

ANTIRECOIL DEVICE FOR PRESSURE CYLINDERS

Clifford C. Vander Wall, Marinette, Wis., assignor to Ansul Chemical Company, Marinette, Wis., a corporation of Wisconsin Application October 5, 1951, Serial No. 249,873

2 Claims. (Cl. 220—27)

This invention relates to a seal construction for pressure cylinders or cartridges containing gas under pressure. More specifically, this invention relates to a seal construction which will relieve excessive pressure which may be developed in a gas cartridge and permit the gas to escape without causing excessive recoil and propulsion of the cartridge which might cause damage or injury.

Further details and advantages of the present invention will be apparent from the following specification and appended drawings, wherein Figure 1 is a fragmental elevational view, partly in section, of a dry chemical fire-extinguishing device provided with a gas cartridge having a seal construction made in accordance with the present invention, Figure 2 is a fragmental elevational view, partly in section, of a gas cartridge sealed with a seal construction in accordance with the present invention under normal pressure conditions.

Figure 3 is a view similar to the one shown in Figure 2 showing the pressure building up within the cartridge and with the resultant deformation of the primary diaphragm, Figure 4 is a view similar to Figure 3 illustrating the flow of gas released through the discharge holes of the seal in such quantities as to prevent recoil or excessive rocketing of the cartridge, and Figure 5 is an exploded view of the elements comprising the cartridge seal.

Referring to Figure 1, the construction shown is a dry chemical fire extinguisher of the type disclosed in Patent 2,531,123, November 21, 1950, comprising a steel storage cylinder 1 in which is stored powdered dry chemical. The storage cylinder 1 is provided with a cartridge receiver 10 retained therein by spud 2. The cartridge receiver 10 is provided with a bushing 11 and retaining ring 12 for guiding a downwardly movable puncture pin 13. Pin 13 is actuated by means of puncture lever 3 retained on link 7 by pin 5. Link 7 is attached to fitting 10 by rivet 8. Puncture lever 3 is attached to the shank of puncture needle 13 by pin 4. Lever 3 rocks on pin 5. A flexible rubber cap 9 is provided to cover the upper portion of the puncture mechanism against entry of moisture and dirt. A guard 19 is also provided to protect the assembly against external impact or damage.

The lower end of cartridge receiver 10 is provided with a cylindrical bore for retaining an insert 14 which is internally threaded to receive the threaded neck portion 30 of gas cartridge 17.

The neck portion 30 is threaded internally to receive a threaded cylindrical seal body 16 which is adapted to retain a pair of spaced frangible sealing diaphragms. The seal body is internally bored for receiving a primary or safety frangible diaphragm 23 which is retained therein by a bushing 24. The seal body is also provided with an annular seat 31 for supporting a spaced upper secondary frangible diaphragm 21 which is retained by an annular ring 22. The annular ring 22 is positioned between the diaphragms 21 and 23 and serves to retain their fixed spaced relation. The ring 22 is provided with a plurality of radially extending holes 27 of suitable diameter which communicate with the interior of the ring and with an annular channel 28 extending about the outer periphery thereof, as shown in Figure 5.

Seal body 16 is provided with a plurality of body relief holes 26 which are positioned so as to communicate with the channel 28 in ring 22. Seal body 16 is also provided at its outer periphery with a plurality of spaced axially extending grooves 25 which extend for the full length of the seal body.

The seal elements described are assembled in the neck portion of cartridge 17 to assume the normal position shown in Figure 2. In this condition the gas 18 in cartridge 17 will be sealed and retained in cartridge 17 by the primary diaphragm 23. Such sealed cartridge is positioned in a dry chemical fire extinguisher in the position shown in Figure 1 by screwing the threaded neck 30 of the cartridge 17 so as to securely retain the neck portion 30 in the insert 14 of cartridge receiver 10. A gasket 15 is interposed between the upper portion of the neck 30 of the cartridge 17 and the receiver 10 to provide a tight seal.

Cartridge 17 may be provided with a nut 20 for convenience in preventing rotation of the cartridge 17 when seal body 16 is inserted or removed therefrom.

When it is desired to use the fire extinguisher, puncture lever 3 is depressed after removing locking pin 4 so as to depress puncture pin 13 to puncture both diaphragms 21 and 23. The gas 18 in cartridge 17 will then pass upwardly through the inner bore of the cartridge receiver 10 and through passage 35 into the container 1 for expelling the powdered dry chemical stored therein.

In event the pressure in cartridge 17 should develop to an excessive degree, primary diaphragm 23 will at first deform, as shown in Figure 3, by the gas pressure in cartridge 17 and will then burst, as shown in Figure 4, while secondary diaphragm 21 will remain intact and in sealed relation. The primary diaphragm 23, for example, may burst at 4000 to 4500 p. s. i. while the secondary diaphragm 21 has a bursting strength of 6000 p. s. i. When the primary diaphragm 23 bursts, the gas 18 in cartridge 17 will pass through the relief holes 27 in the ring 22 into the channel 28, through the seal body relief holes 26 and upwardly through grooves 25 in streams 18A, as shown in Figure 4, thereby relieving the pressure in cartridge 17 at such rate as to prevent excessive recoil of the cartridge and any parts assembled therewith such as a fire extinguisher.

In conventional gas cartridge seal constructions only a single diaphragm is employed to seal the cartridge and when excessive pressure develops to burst such seal, the sudden escape of gas may develop sufficient recoil to rocket or propel the entire unit causing injury to anyone who might be hit by the unit. In the present construction, such recoil or rocket action is avoided because the secondary diaphragm remains intact when the primary diaphragm is burst by excessive pressure and serves to permit the gas to escape more slowly through the openings as previously described. The present seal construction is thus adapted for normal use in sealing a gas cartridge and can be readily ruptured for releasing gas therefrom when used, for example, in fire-extinguishing equipment. In event excessive pressure should develop within the gas cartridge due to heat or other causes which is sufficient to burst the sealing diaphragm, only the primary diaphragm will be ruptured, as previously explained, so as to permit the gas to escape at a sufficiently slow rate to avoid excessive recoil of the cartridge which would otherwise occur if the usual single sealing diaphragm should rupture.

It is to be understood that changes and modifications may be made in the illustrative embodiment of the invention herein described which are intended to be included within the scope of the appended claims.

I claim:

1. A seal construction for a gas retaining cartridge comprising a seal body adapted to be removably retained in the mouth of the cartridge for sealing same, said seal body being provided with an internal bore adapted to communicate with the interior of the cartridge, a primary frangible diaphragm retained in said bore and retained by a bushing in said bore, an annular seat in said bore spaced from said primary diaphragm for retaining a secondary frangible diaphragm, an annular ring positioned between said diaphragms for maintaining same in fixed spaced position, said ring being provided with a plurality of spaced openings communicating with the space between said diaphragms and an annular groove in the outer periphery of said ring, a plurality of openings in said seal retaining body extending radially of said body and communicating with the annular groove in said ring, a plurality of spaced longitudinal grooves extending the entire length in the outer periphery of the seal retaining body, said grooves communicating with the space between said spaced diaphragms through the openings in said seal body and annular ring, the bursting strength of the secondary diaphragm being greater than the bursting strength of said primary diaphragm, said primary diaphragm being adapted to rupture while the secondary diaphragm remains unruptured at a predetermined gas pressure in the cartridge to permit the gas to escape without excessive recoil of the cartridge.

2. A seal construction for a gas retaining cartridge comprising a seal body adapted to be removably retained in the mouth of the cartridge for sealing same, said seal body being provided with an internal bore adapted to communicate with the interior of the cartridge, a primary frangible diaphragm retained in said bore and retained by a bushing in said bore, an annular seat in said bore spaced from said primary diaphragm for retaining a secondary frangible diaphragm, said seal retaining body being threaded at its outer periphery for removable retention in the mouth of the gas cartridge, a plurality of openings in said seal retaining body extending radially of said body and communicating with the annular groove in said ring, a plurality of spaced longitudinal grooves extending the entire length in the outer periphery of the seal retaining body, said grooves communicating with the space between said spaced diaphragms through the openings in said seal body and annular ring, the bursting strength of the secondary diaphragm being greater than the bursting strength of said primary diaphragm, said primary diaphragm being adapted to rupture while the secondary diaphragm remains unruptured at a predetermined gas pressure in the cartridge to permit the gas to escape without excessive recoil of the cartridge.

CLIFFORD C. VANDER WALL.

REFERENCES CITED

The following references are of record in the file of this patent:

UNITED STATES PATENTS

| Number | Name | Date |
|--------|------|------|
| 568,680 | Henderson | Sept. 29, 1896 |